Patented Oct. 8, 1946

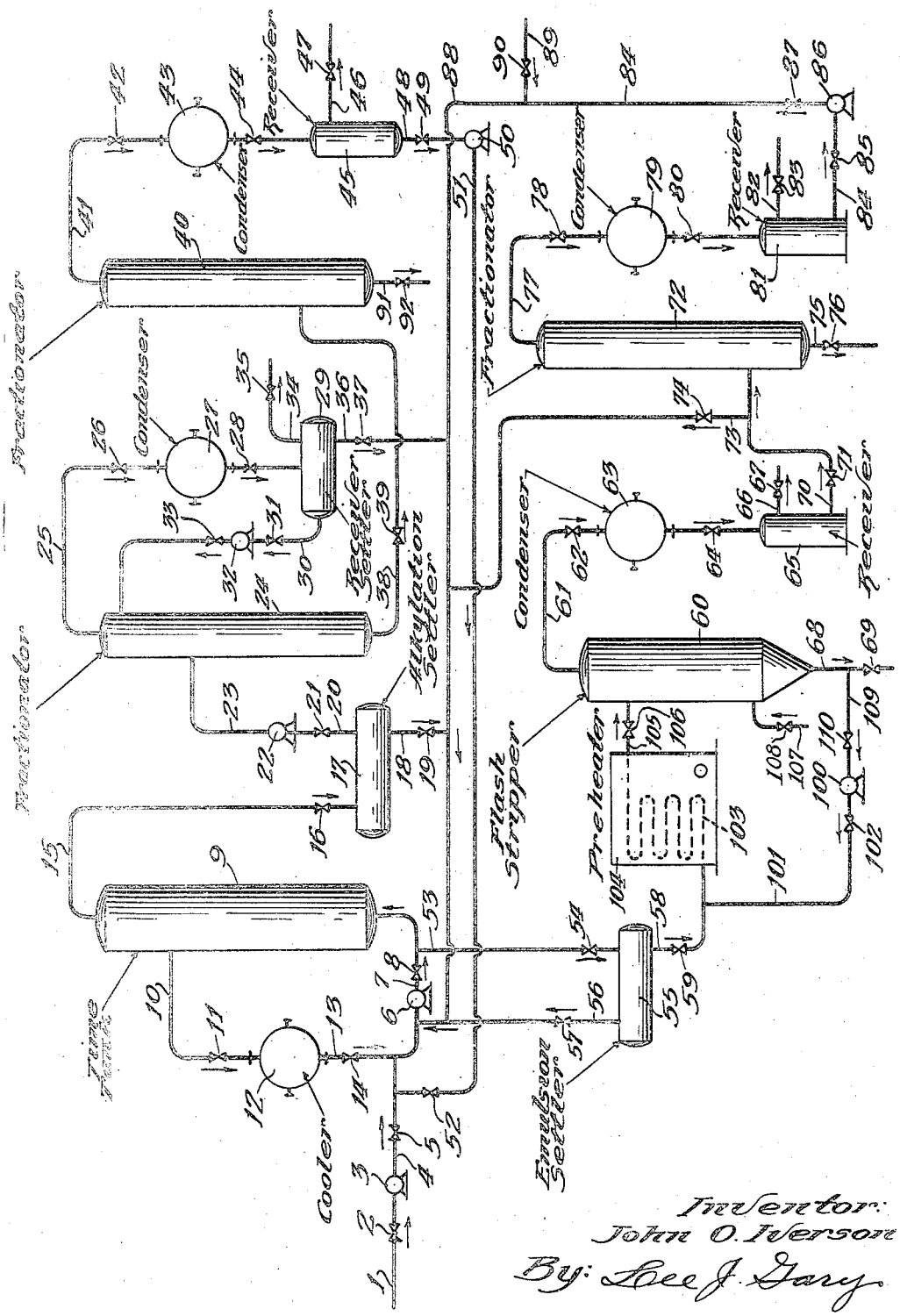

2,408,933

UNITED STATES PATENT OFFICE 2,408,933

HYDROGEN FLUORIDE ALKYLATION PROCESS

John O. Iverson, Chicago, Ill., assignor to Universal Oil Products Company, Chicago, Ill., a corporation of Delaware Application March 27, 1944, Serial No. 528,206

9 Claims. (Cl. 260—683.4)

This application is a continuation-in-part of my co-pending application Serial #444,939, filed May 29, 1942 which in turn is a continuation-in-part of my co-pending application Serial #404,607, filed July 30, 1941, Patent No. 2,388,918, granted November 13, 1945.

This invention relates to an improved process for the reaction of isoparaffins with olefins in the presence of a hydrogen fluoride catalyst and more particularly to a method of regenerating the used catalyst.

The reaction of isoparaffins with olefins in the presence of a hydrogen fluoride catalyst is an important method of producing saturated branched chain hydrocarbons having high antiknock values and suitable for use in aviation fuels. In the usual manner of conducting this process, a liquid mixture of isoparaffins and olefins is agitated together with a liquid hydrogen fluoride-containing catalyst until the reaction is complete, and the resultant mixture is then allowed to settle in order to separate the hydrocarbon reaction products from the catalyst. In this invention, steps have been included for recovering and regenerating the used hydrogen fluoride catalyst which will materially reduce the cost of the catalyst for the process and are therefore highly desirable from a commercial viewpoint.

Broadly, the present invention comprises a process for alkylating isoparaffins with olefins which includes the steps of contacting said isoparaffins and olefins with a hydrogen fluoride catalyst under alkylating conditions, separating the hydrocarbon reaction products from the used catalyst, returning at least a portion of said used catalyst to the alkylating zone, recovering purified hydrogen fluoride from another portion of said used catalyst, separately recovering dissolved hydrogen fluoride from the hydrocarbon reaction products, and returning the hydrogen fluoride recovered in each of said last two steps to the alkylating zone.

In one specific embodiment the invention comprises a process for reacting isobutane with normally gaseous olefins which includes contacting said isobutane and olefins with a hydrogen fluoride catalyst under alkylating conditions, introducing the reaction mixture into a settling zone wherein a substantial proportion of the used hydrogen fluoride catalyst is separated from the hydrocarbon reaction products, returning at least a portion of said used hydrogen fluoride catalyst to the alkylating zone, subjecting the separated hydrocarbon reaction products to fractionation for the removal of dissolved hydrogen fluoride overhead, condensing and returning the hydrogen fluoride to the reaction zone, subjecting the remaining hydrocarbon reaction products to fractionation for the separation of an unconverted isobutane fraction and a motor fuel product, returning said isobutane fraction to the alkylating zone, continuously withdrawing from the alkylating zone a stream of used hydrogen fluoride catalyst, heating at least a portion of said stream of used hydrogen fluoride catalyst to a temperature sufficient to decompose a substantial portion of the organic fluorides contained therein and flash vaporizing said heated stream of used hydrogen fluoride catalyst in the presence of heated isobutane vapors to recover purified hydrogen fluoride vapors from heavier organic materials comprising essentially polymers, returning a portion of said purified hydrogen fluoride to the alkylating zone, subjecting another portion of the purified hydrogen fluoride to fractionation whereby to separate relatively dry hydrogen fluoride from a mixture of water and hydrogen fluoride and condensing and returning the purified and dried hydrogen fluoride to the alkylating zone.

Hydrogen fluoride is slightly soluble in hydrocarbons. Therefore, the products from the reaction zone will contain a small amount of the order of 1% of dissolved hydrogen fluoride. The fractionation step following the reaction zone may be operated so as to remove propane, butane, or other light hydrocarbons and also the dissolved hydrogen fluoride. Upon condensation of the overhead stream, the hydrogen fluoride forms a separate layer which may be returned to the alkylation zone, and the condensed hydrocarbons are returned to the fractionation step. In order to remove the hydrogen fluoride which has a higher boiling point than either butane or propane, it is necessary to vaporize a relatively large quantity of hydrocarbons. If no propane is to be removed from the reaction products, the hydrogen fluoride may be removed by vaporizing, condensing, and refluxing higher boiling hydrocarbons. This step of removing and recovering the dissolved hydrogen fluoride from the product is important because its presence in the finished product would present a serious corrosion problem and possible health hazard and would increase the amount of catalyst that would have to be added to the process.

The hydrogen fluoride catalyst tends to lose a substantial proportion of its activity after a period of use. This decrease in activity is mainly due to two factors, namely, the contamination of the hydrogen fluoride with organic material and the dilution with water. Although it is not known whether the nature of the contamination is a solution effect or a loose chemical combination, it has been discovered that this contaminating organic material can be removed and the activity of the catalyst restored by heating and distilling off the active hydrogen fluoride. An organic material containing hydrocarbon polymers remains after the distillation.

Hydrogen fluoride has a great affinity for water and it is very difficult to remove water from the catalyst by ordinary dehydrating methods. Although the incoming charge may be very nearly dry, nevertheless, the catalyst will gradually accumulate water. This water not only reduces the catalyst activity, but also makes the hydrogen fluoride more corrosive to the apparatus in which it is handled. It is desirable to maintain the concentration of water in the hydrogen fluoride below about 10%.

In the process of this invention, the water is removed from the catalyst in a fractionation step in which substantially dry hydrogen fluoride is distilled off and a mixture of hydrogen fluoride and water is withdrawn as reflux condensate. This mixture may be a constant boiling mixture containing about 35 to 40% of hydrogen fluoride or some other mixture of higher hydrogen fluoride content.

Any suitable apparatus or reactor may be employed to contact the hydrocarbon reactants with the liquid catalyst in the reaction zone. It is only essential that very intimate contact between the two liquids be maintained for a period of time sufficient for the reaction. In general, some form of agitation such as mixing, stirring, etc., obtained in various types of apparatus such as Stratford contactors or turbo mixers is used thereby forming an intimate mixture or emulsion of the hydrocarbon and hydrogen fluoride. In one particular form of apparatus illustrated in the drawing, this agitation is obtained by continuously recycling a large portion of the reactants in the time tank through an external cooler and causing this emulsion to pass through rather small openings in a series of horizontal plates placed in the time tank whereby intimate contact is maintained between the hydrogen fluoride and hydrocarbon phases. A stream of fresh reactants is continuously added to the recirculating emulsion and a portion of the reaction products is continuously withdrawn from the recirculating emulsion. A settling section is provided in the time tank above the outlet to the recirculation line where most of the hydrogen fluoride in the portion of the withdrawn reaction products can settle back into the recirculating stream. This settling section may eliminate the necessity for an outside settler as it is possible to remove all of the residual hydrogen fluoride carried over with the reaction products in the first fractionating column as hereinafter described.

A feature of the present invention is the flash vaporization system employed for the regeneration of the used catalyst. The most important factors which must be taken into consideration for the successful regeneration of the catalyst are the temperature at which the spent catalyst is preheated prior to the introduction of said material into the regeneration zone and the introduction of isobutane stripping medium into the lower section of the regeneration zone. The preheating of the spent catalyst performs a twofold function in the operation, namely, the introduction of heat into the fractionation zone and more important, the decomposition of the organic fluorides to polymers and hydrogen fluoride, thereby permitting the separation of the hydrogen fluoride in the subsequent flash distillation zone. This decomposition can be obtained at temperatures within the range of about 200 to about 800° F., depending primarily upon the residence time of the organic fluorides in the heating zone. The maximum temperature to which this mixture may be heated is controlled somewhat by the type of materials employed in the construction of the preheating zone. It is understood, of course, that any corrosion of this material is greatly accelerated by increased temperatures. This, therefore, is a primary consideration in determining a maximum temperature to be employed to accomplish the decomposition reaction. I have found that with the usual type of construction materials, temperatures of the order of 200 to 550° F. are satisfactory.

As previously stated, the decomposition reaction obtained in the preheater is dependent upon the temperature and residence time of the organic material in said zone. Therefore, in designing preheaters, the size of the preheating zone is dependent to some extent upon the temperature to be employed therein.

The addition of heated isobutane to the bottoms permits the use of a direct heating medium instead of the conventional reboiler. Various difficulties have been encountered when employing indirect heat exchangers as a source of heat for the distillation. These difficulties are mainly attributable to the presence of the high boiling polymers in the spent acid upon constant reboiling in the bottom of the column. These high boiling polymers tend to form heavy carbonaceous materials which deposit upon the outer surfaces of the reboiler forming a film and preventing effective heat transfer from the heating medium to the liquid bottoms. Eventually, the heat transfer becomes so inefficient that it is necessary to discontinue the regeneration and remove the deposition from the surfaces of the reboiler. The addition of these light vapors decreases the viscosity of the bottoms and permits more effective stripping so that a bottoms product substantially free of hydrogen fluoride may be obtained.

By operating the regeneration zone by a controlled reduction of pressure, a partial vaporization or flashing is accomplished which permits the separation of the hydrogen fluoride and water from the heavier hydrocarbons and by maintaining the hydrogen fluoride and water in a vaporous state, the undesirable effects of corrosive liquid hydrogen fluoride-water mixtures are eliminated in the regeneration zone. The vaporous hydrogen fluoride and water are removed overhead and further treated in suitable equipment to separate a relatively dry hydrogen fluoride from the constant boiling hydrogen fluoride-water mixture.

The accompanying diagrammatic drawing illustrates one specific form of apparatus employing the features of the invention and in which the process of the invention may be conducted.

Referring to the drawing, a normally gaseous charge consisting essentially of isobutane, butylenes, and butane is passed as a liquid under pressure through line 1, valve 2, and charge pump 3 to line 4. The charge is combined in line 4 with a recycled isobutane fraction from line 51. The combined feed from line 4 is then admitted to line 13 containing a recirculating emulsion of hydrogen fluoride and hydrocarbons. The resultant commingled mixture is then passed through pump 6, line 7 and valve 8 to time tank 9, in which the interaction of olefinic and isoparaffinic hydrocarbons is substantially completed. A large portion of the emulsion of hydrocarbons and hydrogen fluoride from time tank 9 is withdrawn through line 10 and valve 11, through cooler 12, wherein a portion of the heat of reaction is removed and thence through line 13 and valve 14 into recirculating pump 6. The combination of time tank 9 with the emulsion recirculating system comprises the reaction zone.

A small portion of the emulsion of hydrocarbon and hydrogen fluoride from time tank 9 passes through line 15 and valve 16 to alkylation settler 17 wherein hydrogen fluoride is settled out into a lower layer and withdrawn through line 18 and valve 19 as shown later. The hydrocarbon from alkylation settler 17 passes through line 20, valve 21, pump 22 and line 23 to fractionator 24. The vapors from fractionator 24 pass through line 25 and valve 26, condenser 27, and valve 28 to receiver 29. This fractionation column removes the propane and dissolved hydrogen fluoride from the product. However, it is necessary to reflux a large amount of hydrocarbon in order to remove all of the dissolved hydrogen fluoride. This reflux is returned from receiver 29 through line 30, valve 31, pump 32, and valve 33 to the upper portion of fractionator 24. Any gaseous propane that may be present is removed through line 34 and valve 35. The hydrogen fluoride which separates as a heavy lower layer in the bottom of receiver 29 will be withdrawn through line 36 and valve 37 to be returned to the process as shown later. The reflux condensate from fractionator 24 is withdrawn through line 38 and valve 39 and directed to a second fractionation step in fractionator 40. From this fractionation the overhead product, consisting mainly of isobutane, is withdrawn through line 41, valve 42, condenser 43 and valve 44 to receiver 45. Any noncondensable gases present will be removed through line 46 and valve 47. The liquid isobutane passes through line 48, valve 49, pump 50, line 51, and valve 52 to the beginning of the process where it is combined with the charge in line 4. A product consisting of n-butane and alkylate is withdrawn through line 91 and valve 92.

The above described catalyst regeneration process eliminates the accumulation of a corrosive constant boiling mixture of hydrogen fluoride in any part of the apparatus where it would be harmful. To minimize the danger of accumulation of constant boiling mixture, the top temperature of the fractionator is maintained sufficiently high to insure that the water is carried overhead.

In order to maintain the catalyst activity in the reaction system, a small portion of the catalyst is continuously regenerated and recycled to the system. This regeneration is accomplished in the following manner:

A stream of hydrocarbon and hydrogen fluoride emulsion is withdrawn from circulating line 7 through line 53 and valve 54 to an emulsion settler 55 wherein the hydrogen fluoride settles out. The hydrocarbon layer substantially freed from hydrogen fluoride is returned to the reaction zone through line 56 and valve 57. Hydrogen fluoride catalyst containing organic contaminating materials is passed from emulsion settler 55 through line 58 and valve 59 to heating coil 103 disposed in preheater 104. This preheater may be a fired heater or a heat exchanger of any desired type which provides sufficient temperature and time to decompose the organic fluorides present in the used hydrogen fluoride catalyst. The heated used hydrogen fluoride catalyst passes through line 105 and pressure reducing valve 106 to flashing stripper 60, the function of which is to separate the lighter hydrogen fluoride and water from the heavier organic materials. By flashing the hydrogen fluoride and water to a vapor, the undesirable effects of corrosive liquid hydrogen fluoride-water mixtures are eliminated. The purified hydrogen fluoride is taken overhead through line 61 and pressure control valve 62, condenser 63 and valve 64 to receiver 65 equipped with conventional gas release line 66 and valve 67. The heavier materials consisting essentially of organic polymers is withdrawn from the bottom of flash stripper 60 through line 68 and valve 69. A small amount of light hydrocarbons may also be carried overhead with the hydrogen fluoride. The purified liquid hydrogen fluoride in receiver 65 is withdrawn through line 70 and valve 71 and is then divided into two streams, one passing through line 70 to fractionator 72 and the other passing through line 73 and valve 74 to be recycled to the alkylation stage of the process, as will be described later.

In fractionator 72, any water that is present in the hydrogen fluoride is removed in the reflux condensate as a constant boiling mixture of water and hydrogen fluoride, or some mixture of higher hydrogen fluoride content, through line 75 and valve 76. Relatively dry hydrogen fluoride is withdrawn overhead from fractionator 72 through line 77, valve 78, condenser 79 and valve 80 to receiver 81. Provision is made for the removal of any non-condensable gases from this receiver through line 82 and valve 83. The purified and dried liquid hydrogen fluoride passes through line 84, valve 85, pump 86 and valve 87 to be returned to the reaction zone. The combined streams of hydrogen fluoride from lines 84, 36, 18 and 73 are returned through line 88 and line 56 to line 13 and the reaction zone. Fresh hydrogen fluoride catalyst may be added when necessary through line 89 and valve 90.

Flash stripper 60 is supplied with heat by the introduction of preheated isobutane or other light hydrocarbons by means of line 107 controlled by valve 108 in order to assist in the flash vaporization of the hydrogen fluoride and water. This isobutane may come from line 51 or any other suitable source. In cases where the heavy fraction from the flash stripper 60 contains more hydrogen fluoride than desired, a portion of it may be recycled by means of line 109, valve 110, pump 100, line 101, valve 102 and line 58 to coil 103 or in certain cases, the heavy material may be withdrawn through line 68 and valve 69 and subjected to additional treatment in equipment not shown.

The addition of the heated isobutane not only provides a source of heat for the bottoms in the fractionation zone, but also decreases the partial pressure of the hydrogen fluoride in the vapors in equilibrium with the bottoms, thereby permitting the removal of a greater amount of hydrogen fluoride from the bottoms product at the same conditions of temperature and pressure than would be removed if the isobutane were not present.

It will, of course, be understood that the invention is not limited to the specific form of apparatus illustrated and above described, since other forms of apparatus may be utilized to accomplish substantially the same results.

The fractionator shown for the removal of substantially anhydrous hydrogen fluoride will ordinarily be quite small and can be built of materials that will withstand the corrosive hydrogen fluoride-water mixture which accumulates and is withdrawn as reflux condensate. Fractionating columns which are copper or silver lined have been found to be satisfactory.

The preferred range of operating conditions which may be employed in an apparatus such as illustrated and above described for conducting the processes of the invention may be approximately as follows:

The pressure at the outlet of the charge pump 3 and in the reaction zone may be from 125 to 200 pounds per square inch. It is only necessary to use enough pressure to maintain both catalyst and hydrocarbon substantially in the liquid phase. The preferred temperature in the reaction zone may be in the neighborhood of 100 to 125° F., although the reaction will occur at higher temperatures and even at temperatures below 0° F. The time of contact between the hydrogen fluoride catalyst and the hydrocarbon charge, defined as the volume of catalyst in the reaction zone divided by the volume per minute of hydrocarbon feed to the reaction zone may be from about 5 to about 80 minutes. Although the ratio of hydrocarbon to hydrogen fluoride in the reaction zone may vary considerably, a suitable ratio will be in the range of 0.5 to 20 parts of hydrocarbon to 1 part of hydrogen fluoride catalyst. The ratio of isoparaffin to olefin in the combined feed to the reaction zone may also vary considerably depending upon other conditions, but will ordinarily be in the range of from 1.5 to 15 molecular proportions of isoparaffin per one molecular proportion of olefin.

A specific example of an operation of the process as it may be conducted in an apparatus such as illustrated and described is as follows: The charging stock is a refinery gas containing 35% isobutane, 31% of butylenes, and the rest essentially normal butane and propane. It is under sufficient pressure to be a liquid as supplied to line 1 and is discharged from pump 3 at a pressure of 150 pounds per square inch, combined with an isobutane recycle fraction through line 51 and then an emulsion of hydrocarbons and hydrogen fluoride through line 13, and the total material is then passed through pump 6, after which the pressure is 190 pounds per square inch. Therefore, the pressure drop in the emulsion recirculation system is about 40 pounds per square inch.

The reacted material withdrawn through line 15 and valve 16 is separated into a hydrogen fluoride layer and a hydrocarbon layer and the hydrocarbon layer is pumped through line 23 to fractionator 24. In this fractionator, small amounts of propane and dissolved hydrogen fluoride are removed. The reflux condensate is again fractionated in fractionator 40 to remove the unreacted isobutane which is recycled through line 51 and valve 52 to the beginning of the process. The ratio of isobutane to olefins in the charge is approximately 1.1 to 1. However, when the recycled isobutane is combined with the charge, the ratio of isobutane to olefins becomes approximately 5 to 1. From the bottom of fractionator 40, a product is withdrawn which contains 53% normal butane and 47% alkylated hydrocarbon. This material may be fractionated further by means not shown in the drawing, to remove butane and high-boiling alkylate and the desired fraction may then be blended with isopentane and leaded or otherwise treated to produce a finished aviation gasoline.

For the regeneration of the used hydrogen fluoride catalyst, which contains about 80% free hydrogen fluoride, the ratio of the volume of catalyst regenerated to alkylate produced may be approximately 1 to 15. The difference in pressure between the suction and discharge of the recirculating pump 8 is about 40 pounds per square inch and is sufficient to recirculate the emulsion through the emulsion settler. The flow through the emulsion settler is normally controlled by valve 57. The hydrogen fluoride layer is removed from emulsion settler through line 58 and passed through preheating coil 103 to flash stripper 60. Preheating coil 103 is operated at a pressure of about 150 pounds per square inch and the flash stripper is operated at a pressure of about 85 pounds per square inch and a temperature of 375° F. Only small amounts of heavy polymers are withdrawn from the bottom of flash stripper 60 through line 68, and an overhead fraction containing about 90% free hydrogen fluoride and the balance light organic materials and water passes through line 61. The amount of purified hydrogen fluoride being sent to fractionator 72 to remove the water present, depends upon the amount of water present in the charge.

Although the example given describes a process for alkylating isobutane with butylenes, the invention is not limited to this process but may also be applied to the alkylation of isobutane with other olefins and the alkylation of other isoparaffins such as isopentane with other olefins such as propylene or pentenes.

It is also within the scope of the invention to incorporate additional catalytic substances or substances promoting the catalytic effect of hydrogen fluoride, such as boron trifluoride, although hydrogen fluoride is the essential component of the catalyst. Commercial "anhydrous" hydrogen fluoride is usually employed.

I claim as my invention:

1. In a process for alkylating isoparaffins with olefins in the presence of a hydrogen fluoride catalyst to produce saturated branched chain hydrocarbons wherein with continued use said hydrogen fluoride catalyst becomes contaminated with accumulated heavy organic material and water, the improvement which comprises separating from the alkylating zone a stream of used hydrogen fluoride catalyst, heating said used catalyst to a temperature sufficient to decompose a substantial portion of the organic fluorides contained therein, introducing the heated catalyst into a flash vaporization zone, effecting therein controlled partial vaporization of said catalyst, removing purified hydrogen fluoride vapors and water vapors overhead from said flash vaporization zone, withdrawing unvaporized heavy organic material from the bottom of said flash vaporization zone, and separately introducing into the bottom of said flash vaporization zone preheated vapors of a relatively low boiling hydrocarbon to liberate and separate hydrogen fluoride from said organic material by the stripping action of said vapors.

2. In a process for alkylating isoparaffins with olefins to produce saturated branched chain hydrocarbons including the steps of contacting said isoparaffins and olefins with a hydrogen fluoride catalyst under alkylating conditions, separating the hydrocarbon conversion products from the used hydrogen fluoride catalyst, returning at least a portion of said used catalyst to the alkylating zone whereby with continued use said hydrogen fluoride catalyst becomes contaminated with accumulated heavy organic material and water, subjecting said conversion products to fractional distillation to remove dissolved hydrogen fluoride from a reflux condensate, condensing and returning the hydrogen fluoride from said fractional distillation to the alkylating zone, subjecting said reflux condensate to a second fractional distillation whereby to separate an unconverted isoparaffin fraction from a second reflux condensate, withdrawing said second reflux condensate as an alkylate product, and returning said unconverted isoparaffin fraction to the alkylating zone, the improvement which comprises preheating a portion of said used catalyst to decompose organic fluorine compounds contained therein, introducing the heated catalyst to a flash distillation zone, removing hydrogen fluoride and water vapors overhead from said flash distillation zone, withdrawing unvaporized heavy organic material from the bottom of said flash distillation zone, separately introducing into the bottom of said flash distillation zone preheated vapors of a relatively low boiling hydrocarbon to liberate and strip from said organic material substantially all of its hydrogen fluoride content, condensing and returning a portion of the hydrogen fluoride and water to the alkylating zone, subjecting another portion of the hydrogen fluoride and water to fractional distillation whereby to separate a mixture of water and hydrogen fluoride as reflux condensate from substantially anhydrous hydrogen fluoride as a vapor, and condensing and returning the substantially anhydrous hydrogen fluoride to the alkylating zone.

3. In a process for reacting isobutane with olefins to produce saturated branched chain hydrocarbons in which a hydrocarbon mixture containing substantial proportions of isobutane and olefins is subjected to alkylation conditions in the presence of a hydrogen fluoride catalyst wherein with continued use said hydrogen fluoride catalyst becomes contaminated with accumulated heavy organic material and water, the improvement which comprises separating a stream of used hydrogen fluoride catalyst from the alkylation reaction zone, heating said stream of used catalyst to decompose organic fluorine compounds contained therein, introducing the heated catalyst to a flash distillation zone, removing hydrogen fluoride and water vapors overhead from said flash distillation zone, withdrawing unvaporized heavy organic material from the bottom of said flash distillation zone, separately introducing into the bottom of said flash distillation zone preheated isobutane vapors to substantially completely remove hydrogen fluoride from said heavy organic material by the stripping action of said vapors, returning a portion of the thus separated hydrogen fluoride and water to said alkylation reaction zone, subjecting another portion of the hydrogen fluoride and water to fractional distillation whereby to separate a mixture of water and hydrogen fluoride as reflux condensate from substantially water-free hydrogen fluoride, and returning said substantially water-free hydrogen fluoride to the alkylation reaction zone.

4. In a process for alkylating isoparaffins with olefins to produce saturated branched chain hydrocarbons in the presence of a hydrogen fluoride catalyst wherein with continued use said hydrogen fluoride catalyst becomes contaminated with accumulated heavy organic material and water, the improvement which comprises separating a stream of used hydrogen fluoride catalyst from the alkylation zone, heating at least a portion of said stream under superatmospheric pressure to a temperature sufficient to decompose a substantial portion of the organic fluorides contained therein, passing said heated stream into a flash vaporization zone maintained at a lower pressure than said superatmospheric pressure, separately introducing into the bottom of said flash vaporization zone preheated isobutane vapors, removing overhead from said flash vaporization zone vapors of purified hydrogen fluoride, water and isobutane, and withdrawing from the bottom of said flash vaporization zone a liquid stream of heavy organic material substantially freed of hydrogen fluoride by the stripping action of said isobutane vapors.

5. A process for the regeneration of contaminated hydrogen fluoride catalyst containing accumulated organic material and water which comprises heating said catalyst under superatmospheric pressure to decompose organic fluorine compounds contained in said catalyst, introducing the heated catalyst into a flash vaporization zone and therein vaporizing hydrogen fluoride and water, removing hydrogen fluoride and water vapors overhead from said zone, withdrawing unvaporized organic material from the bottom of said zone, introducing preheated isobutane vapors into the bottom of said zone to effect the removal of hydrogen fluoride from said organic material by the stripping action of said vapors, and removing said isobutane vapors overhead along with said hydrogen fluoride and water vapors.

6. The process of claim 5 further characterized in that said catalyst is heated in said heating step to a temperature of from about 200° F. to about 550° F.

7. The process of claim 1 wherein said relatively low boiling hydrocarbon is isobutane.

8. The process of claim 1 wherein the heating of said used catalyst is effected at superatmospheric pressure.

9. The process of claim 1 wherein said used catalyst is heated to a temperature of from about 200° F. to about 550° F. prior to its introduction into said flash vaporization zone.

JOHN O. IVERSON.